Patented Dec. 14, 1937

2,102,151

UNITED STATES PATENT OFFICE 2,102,151

METHOD OF MANUFACTURING METALLIC SODIUM

Ryosaburo Hara and Suyekichi Abe, Sendai, Japan, assignors to Asahi Garasu Kabushiki Kaisha, Tokyo, Japan, a corporation of Japan No Drawing. Application July 23, 1935, Serial No. 32,721

2 Claims. (Cl. 204—1)

This invention relates to a method of manufacturing metallic sodium by electrolysis of sodium chloride dissolved in liquid ammonia, the object thereof being to manufacture metallic sodium simply and economically as compared with the known method in which fused salts are electrolyzed.

To carry out this invention into practice, sodium chloride is dissolved in liquid ammonia and the solution is electrolyzed with an adequate potential, current density and temperature, using a diaphragm such as of asbestos cloth, biscuit or porous alundum which prevents the mutual diffusion of the anolyte and catholyte.

As a cathode, a material which does not catalytically accelerate the otherwise very slow reaction, $Na + NH_3 liq. = NaNH_2 + H$, is used, the metals belonging to the group Al, Mg, Cd, Sn, Zn, or amalgamated zinc.

The metallic sodium produced on the cathode dissolves in liquid ammonia and forms a blue solution, from which metallic sodium is obtained by evaporating away the liquid ammonia after separating the blue catholyte from the anolyte. Ammonium chloride may also be obtained from the anolyte by evaporating away the liquid ammonia. The evaporated ammonia may be recovered without any loss and be liquefied to be used repeatedly.

Ions travel much faster in liquid ammonia than in water and accordingly improve the conductivity of salt solutions, even if the concentration is smaller than in water-solutions. Therefore, the electric energy required for the electrolysis of sodium chloride in liquid ammonia is comparatively small.

The following are examples of carrying out this method into practice:—

Dissolve 2 to 15 parts of sodium chloride in 100 parts of liquid ammonia and electrolyze the solution at $-30 \sim +5°$ C., using Al, Mg, Cd, Zn, Sn or amalgamated zinc as cathode, and graphite as anode. Separate the two electrodes from each other by a diaphragm such as of asbestos cloth, porous alundum or biscuit. The current density employed is $0.5 \sim 18$ amp. per sq. dm. for the cathode and the terminal voltage required is $5 \sim 20$ volts.

The metallic sodium liberated at the cathode by electrolysis dissolves in liquid ammonia and the concentration of metallic sodium in liquid ammonia increases gradually till it reaches $0.5 \sim 6$ gr. Na per 100 gr. $NH_3$, although the concentration of sodium in liquid ammonia varies according to the condition of the electrolysis.

With the increase of the concentration of sodium in liquid ammonia, the solution varies from deep indigo blue to dark copper color.

At the anode the liberated chlorine reacts at once with liquid ammonia to produce ammonium chloride and nitrogen.

The catholyte and anolyte are drained frequently into receivers separately and when liquid ammonia is removed by evaporation, bright metallic sodium and ammonium chloride are obtained from catholyte and anolyte respectively. These products are contaminated with a little quantity of sodium chloride. It is possible, if necessary, to separate the metallic sodium from the sodium chloride by fusion.

A mixture of hydrogen and nitrogen resulting presumably from the decomposition of the ammonia by electrolysis is collected and may be utilized for ammonia synthesis.

If a platinum electrode is used as cathode, sodium amide is produced by the catalytic action of the metal. Therefore, it is undesirable to use such a metal as platinum, iron, etc., which has a catalytic action on the formation of sodium amide.

With mercury cathode, the secondary reaction which results in the formation of amalgamated sodium takes place. Therefore, the object of this invention is not attained, but sodium hydroxide may be manufactured by the usual process.

We claim:

1. A method of manufacturing metallic sodium which consists, in combination, in dissolving sodium chloride in liquid ammonia and electrolyzing the solution, utilizing a permeable (or semi-permeable) inorganic diaphragm and a metallic cathode of the group consisting of Al, Mg, Cd, Sn, Zn and amalgamated zinc catalytically accelerate the formation of sodium amide which tend to take place between the metallic sodium and liquid ammonia, and evaporating the indigo blue catholyte after being separated from the anolyte, to liberate metallic sodium having a bright metallic lustre.

2. A method of manufacturing metallic sodium which consists, in combination, in dissolving sodium chloride in liquid ammonia and electrolyzing the solution, utilizing a permeable (or semipermeable) inorganic diaphragm and amalgamated zinc as cathode, and evaporating the indigo blue catholyte after being separated from the anolyte, to liberate metallic sodium having a bright metallic lustre.

RYOSABURO HARA.
SUYEKICHI ABE.